Oct. 11, 1927.
J. T. COOK, JR., ET AL
1,645,372
METAL WORKING APPARATUS
Filed Jan. 15, 1926
2 Sheets-Sheet 2
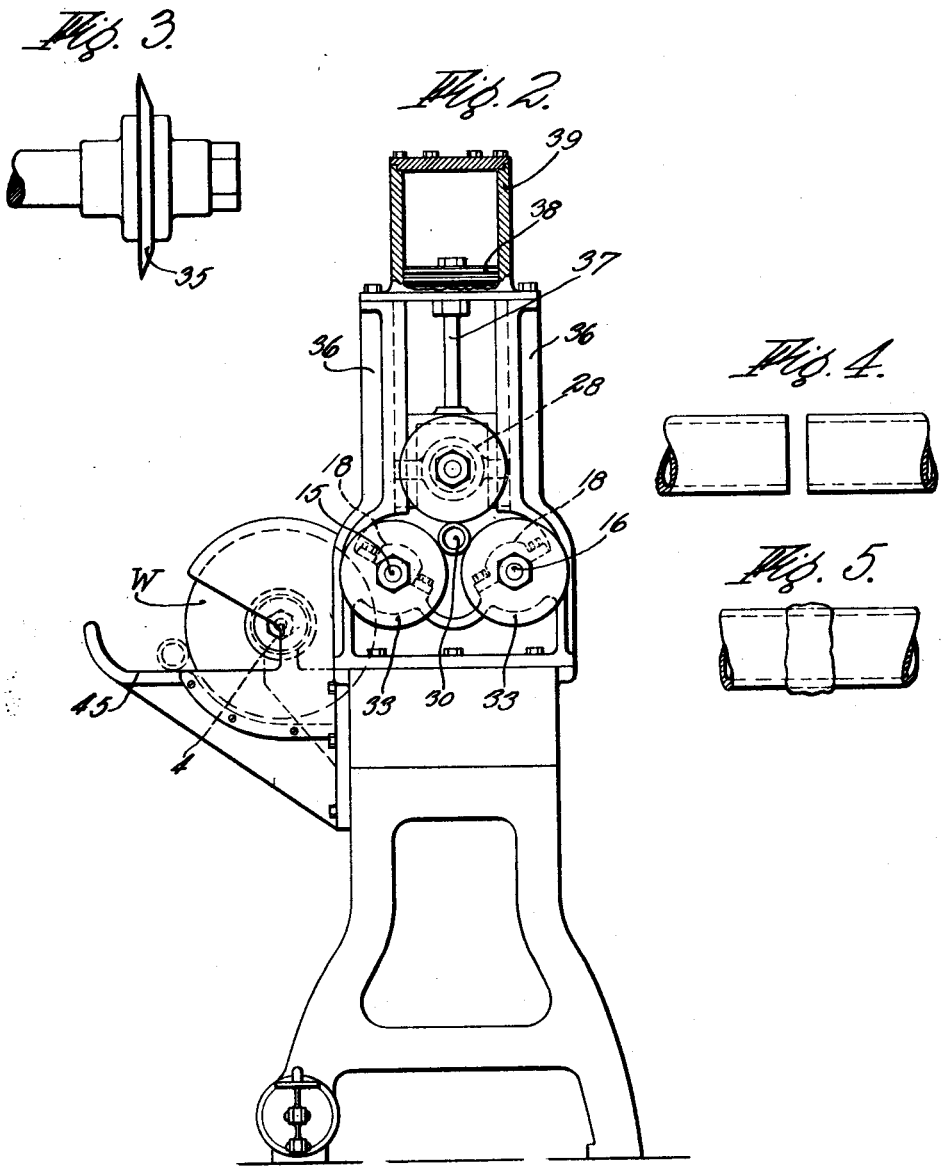
INVENTORS
James T. Cook Jr.,
Joseph W. Murphy,
Thaddeus J. Brzenicki,
BY and Harlan E. Goldsmith.
Chapin + Neal
ATTORNEYS.

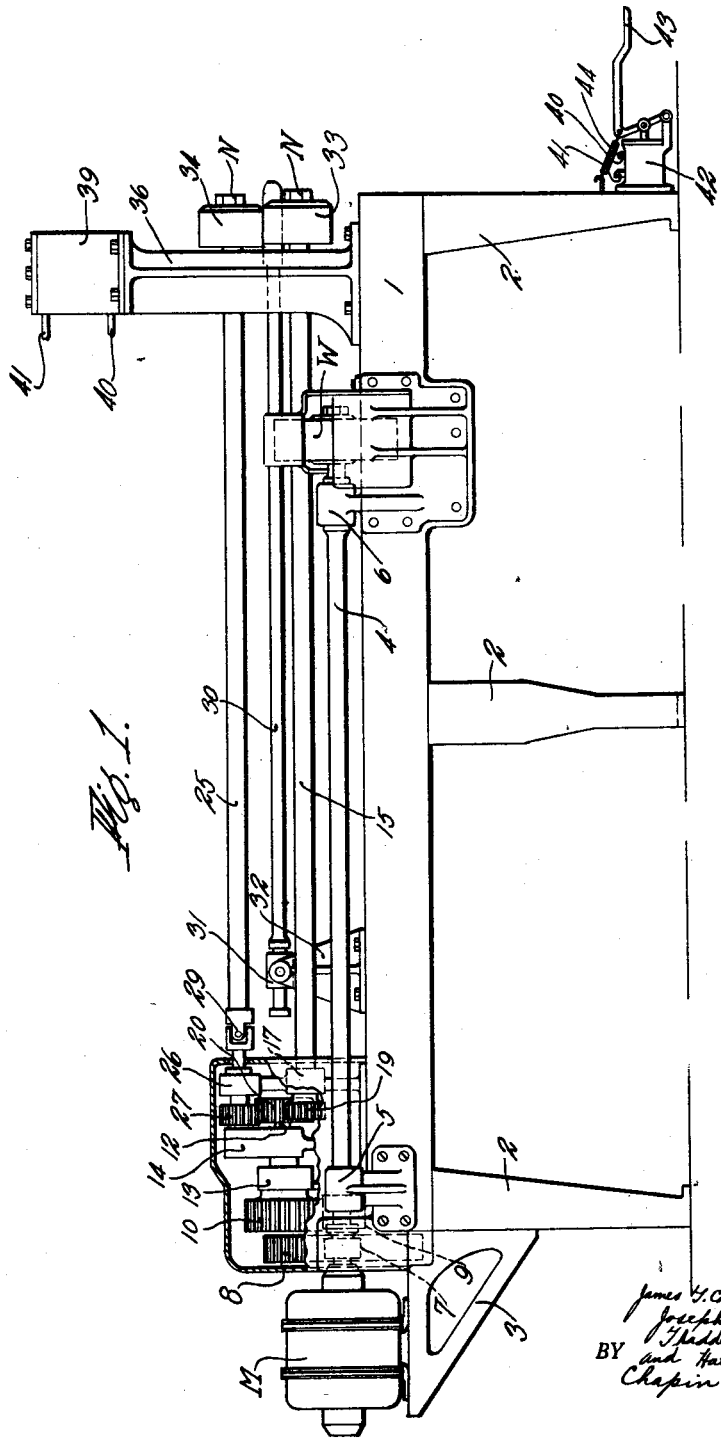

Patented Oct. 11, 1927.

1,645,372

UNITED STATES PATENT OFFICE.

JAMES T. COOK, JR., OF WEST SPRINGFIELD, JOSEPH W. MURPHY, OF SPRINGFIELD, AND THADDEUS J. BRUSNICKI AND HARLAN C. GOLDSMITH, OF WEST SPRINGFIELD, MASSACHUSETTS.

METAL-WORKING APPARATUS.

Application filed January 15, 1926. Serial No. 81,558.

This invention relates to improvements in metal working apparatus and more particularly to apparatus for performing certain operations on tubes or the like as will hereinafter be more fully explained.

The invention is capable of broad application but in the form at present preferred is shown and described for particular use in connection with boiler tubes or other tubular shaped articles. In connection with the welding of boiler tubes, especially that operation known as butt welding by the electrical welding process, the apparatus of our invention is particularly adapted since it is arranged for machining the abutting ends of sections of tubing to prepare them for the butt welding operation and is arranged for removing the circumferential burr or upset portion formed around the tube by the welding thereof.

The novel features of the invention will now be described in connection with the accompanying drawings, in which:

Fig. 1 is a side elevational view of the apparatus embodying the features of our invention;

Fig. 2 is an end elevational view of the same;

Fig. 3 is an elevational view of a cutting tool for use in connection with the apparatus;

Fig. 4 is an end elevational view of the abutting ends of a tube prior to welding; and Fig. 5 is a similar view of the same showing the burr or ridge formed by the butt welding operation.

Referring to the drawings in detail,—a bed is represented at 1 which is supported from the floor in any suitable manner as by legs 2. An electric motor M is supported on brackets 3 and has its shaft connected to a longitudinally rotatable shaft 4 which is carried in bearings 5 and 6 fixed to the bed 1. The shaft 4 is arranged to carry a cutting tool such as an abrasive wheel W and a supporting shelf 45 is fixed to the bed for supporting and guiding work as it is pressed against the wheel.

A driving pinion 7 on the motor shaft is in driving engagement with a gear 8, which gear 8 is fixed to a pinion 9. Both pinion and gear are rotatably mounted on any suitable shaft or stud. The pinion 9 is in meshing engagement with a gear 10 fixed to a shaft 12 mounted rotatably in bearings 13 and 14. By the means just described the shaft 12 receives power from and is driven by the motor M. Shafts 15 and 16 are rotatably mounted in bearings 17 and 18 and are driven by means of gears such as 19 fixed thereto and in engagement with a gear 20 of shaft 12.

A shaft 25, having its rear end rotatable in a non-movable bearing 26, is driven by means of a gear 27 fixed thereto that is in engagement with the gear 20. The forward end of said shaft 25 is rotatable in a movable or sliding bearing 28 while a universal joint 29 is provided so that the forward end of the shaft may be raised or lowered without disturbing the rotative movement imparted thereto by the driving mechanism just described.

A central mandrel 30 is slidable and rotatable in a member 31 which is pivoted in a standard 32 so that the mandrel may be moved up or down, as may be desired and is preferably arranged for insertion in a tube as will be explained. The gearing arrangement may be changed or modified as may be desired or required for driving the respective shafts in any desired relative direction or speed, the modification shown being merely intended to show the embodiment of the invention at present preferred.

Rolls 33 are removably secured to the ends of the shafts 15 and 16 as by nuts N while a similar roll 34 or cutter 35 is removably carried on the end of shaft 25. The bearing 28 is reciprocable between standards 36 at the end of the bed and is connected by a rod 37 to a piston 38 reciprocable in a cylinder 39 at the upper side of the standards. The piston and cylinder may be of ordinary construction and may be connected by suitable piping 40, 41 and a foot operated control valve to any pressure system such as a steam, compressed air or other pressure system. The parts will preferably be arranged so that as the valve 42 is operated by depressing the foot treadle 43, pressure will be admitted to the upper side of the piston to move the piston and shaft downwardly, while as the treadle is released it will be moved in the reverse direction by a spring 44 to cause a reversal of the pressure admitted to the cylinder and so that the piston will be elevated and move the shaft 25 upwardly and remain in that position until the valve is again operated.

In operation, a suitable cutter such as 35, is fixed to the end of shaft 25 and a length of tubing is slipped into place on top of the lower rolls 33 and the end to be cut or trimmed is located in proper position to be acted upon by the cutter. As the motor is started the shafts 15 and 16 are rotated and the supporting rolls rotatably support the tube for the action of the rotating cutter 35. The piston is lowered so that the cutter 35 will act on the tube to trim or cut it off square and true as is desirable for butt welding operations.

After the welding operation a roll such as 34 is fixed on the end of the shaft 25 and the welded tube is slipped over the mandrel and located so that the burr or ridge is between the upper roll 34 and lower rolls 33. When thus located and as the tube is being rotated by the supporting rolls, the upper roll which is being driven, is forced downwardly by the piston and the combined action of the rolls acts to roll down and smooth off the burr or ridge and thereby produces a smooth welded joint.

In case it is desired to further finish or work on the surface of the tube it may be placed on the support 45 adjacent the wheel W as shown in dotted lines and rotated by the operator against the cutting face of the wheel. From the foregoing it will be seen that we have provided a structure in which the tube is supported by rotating supports that tend to rotate it while it is being acted upon by a tool that is also driven for the working operation and arranged to be moved towards and away from the work.

We are aware that many changes may be made in the form of the invention without departing from the scope thereof and we therefore prefer to be limited by the appended claims rather than by the foregoing description.

What we claim is:

1. A machine of the class described comprising in combination, work supporting shafts, a mandrel mounted on said machine substantially parallel to said shafts arranged for movements towards and away therefrom and longitudinally with respect thereto, a tool shaft having its forward end movable towards and away from said mandrel, means for driving said shafts and means for moving said tool shaft towards and away from said mandrel.

2. A machine of the class described comprising in combination, work supporting shafts, a rotatable mandrel mounted on said machine substantially parallel to said shafts arranged for movements towards and away therefrom and longitudinally with respect thereto, a tool shaft having its forward end movable towards and away from said mandrel, common means for driving said shafts and power actuated means for moving said tool shaft towards and away from said mandrel.

3. A machine of the class described comprising in combination, work supporting shafts rotatable in forward and rear bearings at opposite ends thereof, a mandrel having its rear end slidable and rotatable in a member pivoted to said machine adjacent the rear ends of said shafts whereby its forward end may be moved towards and away from said shafts or longitudinally with respect to said shafts, a tool shaft movable towards and away from said mandrel, means for moving said tool shaft and means for driving all of said shafts.

4. A machine of the class described comprising in combination, a frame having driving mechanism at one end thereof and a supporting guide at the opposite end thereof, work supporting shafts driven from said mechanism and extending forwardly thereof having their forward end rotatable in said supporting guide, a mandrel disposed substantially parallel to said shafts having its rear end slidable and rotatable in a member pivoted to said frame whereby its forward end may be moved towards and away from said shafts and longitudinally with respect to the forward end of said shafts, a bearing member in said guide support movable towards and away from said shafts, a flexible tool shaft driven from said mechanism and extending forwardly thereof having its forward end rotatable in said bearing member, and a piston reciprocable in a cylinder carried by said guide support for moving said shaft towards and away from said mandrel and supporting shafts.

5. A machine of the class described comprising in combination, a bed, driving mechanism at its rear end and a supporting guide at the forward end thereof, work supporting shafts driven from and extending forwardly of said mechanism having their forward ends rotatably carried in said supporting guide, a mandrel having its rear end slidable and rotatable in a member pivoted on said bed adjacent said mechanism whereby a tube carried thereby may be moved towards and away from said shafts and longitudinally with respect to said shafts, a bearing member carried by said support that is reciprocable towards and away from the axis of said supporting shafts, a tool shaft driven from and extending forwardly of said mechanism having its forward end rotatable in said bearing member, a universal joint intermediate the ends of said tool shaft to permit the forward end of said shaft to be moved with said bearing and a piston reciprocable in a cylinder carried by said support for moving said bearing and shaft whereby a tool carried thereby may be brought into engagement with a tube carried on the mandrel and supported by the supporting shafts.

In testimony whereof we have affixed our signatures.

JAMES T. COOK, Jr.
JOSEPH W. MURPHY.
THADDEUS J. BRUSNICKI.
HARLAN C. GOLDSMITH.